US012347318B2

(12) United States Patent
Kim

(10) Patent No.: US 12,347,318 B2
(45) Date of Patent: Jul. 1, 2025

(54) DEVICE FOR PREVENTING FALSE WARNING, BLIND-SPOT COLLISION WARNING SYSTEM FOR PREVENTING FALSE WARNING WHEN CHANGING LANES AND METHOD THEREOF

(71) Applicant: HL KLEMOVE CORP., Incheon (KR)

(72) Inventor: Jeongjoo Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 434 days.

(21) Appl. No.: 17/985,151

(22) Filed: Nov. 11, 2022

(65) Prior Publication Data
US 2023/0144727 A1    May 11, 2023

(30) Foreign Application Priority Data
Nov. 11, 2021    (KR) .......................... 10-2021-0154650

(51) Int. Cl.
*G08G 1/16*    (2006.01)
(52) U.S. Cl.
CPC .................................... *G08G 1/167* (2013.01)
(58) Field of Classification Search
None
See application file for complete search history.

(56) References Cited

U.S. PATENT DOCUMENTS

| 7,482,909 | B2 * | 1/2009 | Haug ........................ B60R 1/30 |
| | | | 348/148 |
| 7,643,911 | B2 * | 1/2010 | Ishihara .................... B60R 1/27 |
| | | | 701/1 |
| 2003/0025597 | A1 * | 2/2003 | Schofield ............... G08G 1/163 |
| | | | 340/901 |
| 2009/0079553 | A1 * | 3/2009 | Yanagi ..................... B60R 1/26 |
| | | | 348/148 |

(Continued)

FOREIGN PATENT DOCUMENTS

| JP | 2004-341812 | 12/2004 |
| JP | 2011-034435 | 2/2011 |

(Continued)

OTHER PUBLICATIONS

Office Action dated Sept. 6, 2023 for Korean Patent Application No. 10-2021-0154650 and its English machine translation from Google Translate.

*Primary Examiner* — Muhammad Adnan
(74) *Attorney, Agent, or Firm* — WOMBLE BOND DICKINSON (US) LLP

(57) ABSTRACT

The present invention relates to a blind-spot collision warning system and method, which may include a steering angle sensor for detecting a steering angle of a vehicle; a first rear-side radar for detecting an object on the left rear side of the vehicle; a second rear-side radar for detecting an object on the right rear side of the vehicle; and a control unit for determining a lane change situation at an angle greater than or equal to a set angle according to the steering angle and (Continued)

direction information detected by the steering angle sensor, and correcting the position of the object to the opposite side of the steering direction to prevent the generation of a false warning, when the object is detected by the first rear-side radar or the second rear-side radar in a lane change direction.

19 Claims, 7 Drawing Sheets

(56) References Cited

U.S. PATENT DOCUMENTS

| | | | |
|---|---|---|---|
| 2012/0154591 A1* | 6/2012 | Baur | B60R 1/08 |
| | | | 348/148 |
| 2014/0218213 A1* | 8/2014 | Schneider | G08G 1/167 |
| | | | 340/905 |
| 2020/0114823 A1* | 4/2020 | Arase | B60R 1/28 |
| 2020/0255003 A1* | 8/2020 | Fujii | B60W 30/0956 |
| 2020/0258480 A1* | 8/2020 | Bronder | B60K 35/233 |
| 2021/0024000 A1* | 1/2021 | Peterson | B60R 1/06 |
| 2021/0081684 A1* | 3/2021 | Yamamoto | B62D 15/0275 |
| 2021/0263518 A1* | 8/2021 | Sheng | G05D 1/0214 |
| 2021/0300246 A1* | 9/2021 | Peterson | G06T 11/60 |

FOREIGN PATENT DOCUMENTS

| | | | |
|---|---|---|---|
| JP | 2017-062639 | | 3/2017 |
| JP | 2017062639 A | * | 3/2017 |
| KR | 10-2020-0075930 | | 6/2020 |
| KR | 10-2192549 | | 12/2020 |

* cited by examiner

DEVICE FOR PREVENTING FALSE WARNING, BLIND-SPOT COLLISION WARNING SYSTEM FOR PREVENTING FALSE WARNING WHEN CHANGING LANES AND METHOD THEREOF

CROSS-REFERENCE TO RELATED APPLICATION

This application claims priority to and the benefit of Korean Patent Application No. 10-2021-0154650, filed on Nov. 11, 2021, the disclosure of which is incorporated herein by reference in its entirety.

TECHNICAL FIELD

The present invention relates to a system and method for performing a collision warning by detecting another vehicle in a blind spot on the rear side.

BACKGROUND ART

Recently, techniques for securing safety by checking blind spots during vehicle driving and the technology development for autonomous vehicles are being actively carried out, and in particular, various techniques have been proposed for identifying blind spots, determining distances from objects and determining the types of objects by using various sensors.

The blind-spot collision warning (BCW) system or blind-spot detection (BSD) system, which is a system that detects other vehicles in the blind spot when changing lanes and notifies the driver of the risk of a collision, uses radar sensors to detect the presence of a traveling vehicle in other lanes on the left and right sides of the vehicle and visually and/or aurally alerts the driver.

The aforementioned BCW and BSD systems have the advantage that they can help safe driving by detecting vehicles approaching from the rear side, but when changing lanes, they generate a false warning according to the change in the detection area of the radar sensor according to the steering angle, and thus, there was a problem in that it could confuse the driver.

FIG. 1 is an exemplary diagram for explaining a situation in which a false warning is generated in the conventional blind-spot collision warning system.

As illustrated in (a) of FIG. 7, in a situation when a host vehicle 100 drives on a specific lane (L1) and changes the lane to a lane (L2) located to the left of the lane (L1), according to the change in the steering angle of the host vehicle 100, a target vehicle 200 driving the lane (L1) from the rear side of the host vehicle 100 is located within a left detection area (DAL), and a warning is generated.

This is a false warning state in which a warning is generated in a situation where there is no risk of collision with the target vehicle 200 traveling in the lane (L1) on the rear side of the host vehicle 100, and the driver of the host vehicle 100 may be confused for the generation of a false warning.

In addition, as illustrated in (b) of FIG. 7, after the host vehicle 100 completely changes the lane to the change target lane (L2), the target vehicle 200 driving in the lane (L1) before changing is detected in a right detection area (DAR).

In the above example, the change of the host vehicle 100 from the lane (L1) before changing to the lane (L2) after changing on the left side is illustrated and described, but it may also be applied to a lane change in the opposite direction.

In order to explain the generation of such a false warning in more detail, when the lane of the host vehicle 100 is changed, according to changes in the yaw rate due to a sudden change in the steering angle such as a counter steer, the geometry of the host vehicle 100 is changed due to a sudden change in the driving path from a straight line to a curved line back to a straight line.

Particularly, in a situation where the vehicle is driven at a speed of 20 to 30 km/h, changes in the driving path have a greater effect on the generation of a false warning according to changes in the yaw rate.

Korean Registered Patent No. 10-2192549 (BLIND SPOT MONITORING SYSTEM, registered on Dec. 11, 2020), which is a related art, describes a technique which is capable of varying the blind spot monitoring area during careless driving by detecting the driver's careless driving condition.

However, since the above registered patent is based on the driver's careless driving condition, it is not suitable for a normal lane change situation.

DISCLOSURE

Technical Problem

The technical problem to be solved by the present invention in view of the aforementioned problems is directed to providing a blind-spot collision warning system and method, which are capable of correcting the position of a target vehicle according to a change in a steering angle in a normal lane change situation.

Another object to be solved by the present invention is to provide a blind-spot collision warning system and method, which are capable of suppressing warnings in a situation where there is a risk of the generation of a false warning.

Technical Solution

The blind-spot collision warning system according to an aspect of the present invention for solving the aforementioned problems may include a steering angle sensor for detecting a steering angle of a vehicle, a first rear-side radar for detecting an object on the left rear side of the vehicle, a second rear-side radar for detecting an object on the right rear side of the vehicle, and a control unit for determining a lane change situation at an angle greater than or equal to a set angle according to the steering angle and direction information detected by the steering angle sensor, and correcting the position of the object to the opposite side of the steering direction to prevent the generation of a false warning, when the object is detected by the first rear-side radar or the second rear-side radar in a lane change direction.

In an exemplary embodiment of the present invention, after changing lanes, if an attempt is made to change the lane at an angle greater than or equal to a first set angle in the opposite direction to the previous lane change direction within a set time, when an object is detected by the second rear-side radar or the first rear-side radar in the current lane change direction, the control unit may determine not to correct the position of the object.

In an exemplary embodiment of the present invention, the first set angle may be 20 degrees to 25 degrees, or −20 degrees to −25 degrees.

In an exemplary embodiment of the present invention, when the steering angle detected by the steering angle sensor is within a second set angle which is set based on 0 degrees, the control unit may determine that the lane change is completed, and return the position of the corrected object to the original position when the lane change is completed.

In an exemplary embodiment of the present invention, the second set angle may be −2 degrees to 2 degrees.

In addition, the method for generating a blind-spot collision warning according to another aspect of the present invention is a method for generating a blind-spot collision warning which is performed by a control unit and may include the steps of a) determining a lane change situation when the steering angle is greater than or equal to a first set angle, and b) correcting the position of a detected object to the opposite side of the steering direction, when an object is detected on the side and rear side of a first steering direction in a lane change situation.

In an exemplary embodiment of the present invention, the method may further include the step of c) determining that the steering is complete when the steering angle is within a second set angle based on 0 degrees, and returning the position of a corrected object to the original position, after step b).

In an exemplary embodiment of the present invention, if it is determined that a lane change situation has occurred in a second steering direction which is the opposite direction of the first steering direction at an angle greater than or equal to the first set angle within a set time after step c), it may be determined whether there is an object in the rear side in the second steering direction, and a warning may be generated without correcting the position of the object if there is an object.

In an exemplary embodiment of the present invention, the first set angle may be −20 degrees to −25 degrees and 20 degrees to 25 degrees.

In an exemplary embodiment of the present invention, the second set angle may be −2 degrees to 2 degrees.

Advantageous Effects

The present invention has the effect of preventing the confusing situation of a driver by the generation of a false warning by detecting a change in the steering angle, detecting a lane change situation according to the size of the steering angle, and correcting the position of the target vehicle when the size of the steering angle is greater than or equal to a set angle to prevent the generation of a false warning.

In particular, the present invention has the effect of being able to help with safe driving by maintaining a normal warning generation state by limiting the case of target position correction, and not performing position correction of the target vehicle in the driving state to return to the original lane from a lane change completion state.

MODES OF THE INVENTION

Figure 1:
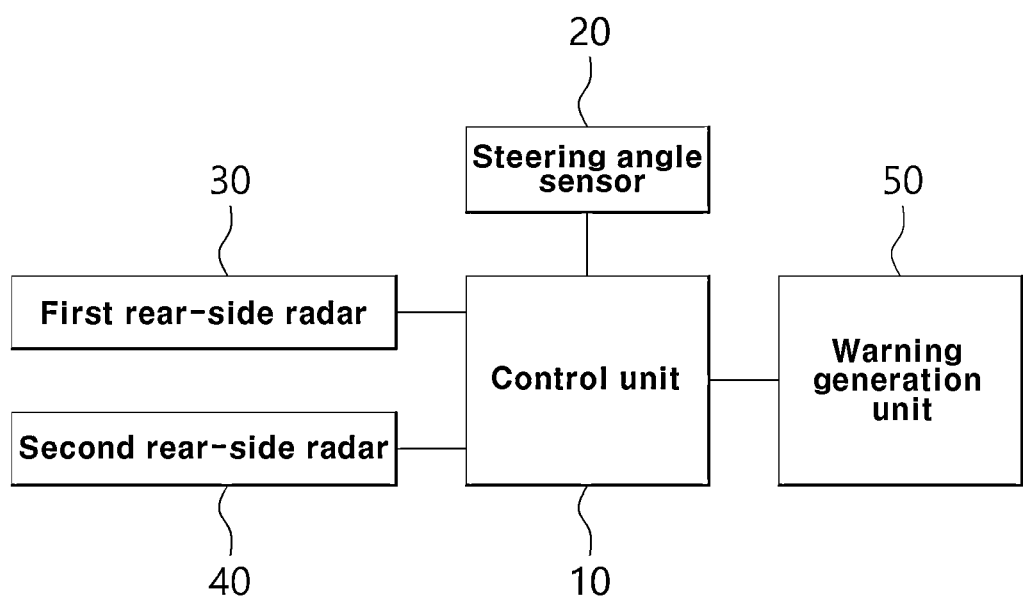
FIG. 1 is a block diagram of the blind-spot collision warning system according to a preferred exemplary embodiment of the present invention.

Hereinafter, the present invention will be described in detail with reference to the accompanying drawings with respect to the blind-spot collision warning system and method.

The exemplary embodiments of the present invention are provided to describe the invention more fully to those of ordinary skill in the art, and the exemplary embodiments described below may be modified in different forms, and the scope of the present invention is not limited thereto. Rather, these exemplary embodiments are provided so that the present invention will be thorough and complete and will fully convey the spirit of the invention to those of ordinary skill in the art.

Terms used herein are intended to describe particular exemplary embodiments and are not intended to limit the scope of the present invention. Unless the context clearly indicates otherwise, a singular form may include a plural form. As used herein, the terms "comprise" and/or "comprising" specify the presence of mentioned shapes, numbers, steps, operations, members, elements, and/or groups thereof, but do not exclude presence or addition of at least one other shape, number, step, operation, member, element, and/or group thereof. As used herein, the term "and/or" includes any and all combinations of one or more of the associated listed items.

In the present specification, the terms "first," "second" and the like are used to describe various members, areas and/or regions, but do not limit such members, parts, areas, layers and/or regions. These terms do not mean a certain order, top or bottom, or priority and are used only to distinguish one member, area or region from another member, area or region. Therefore, a first member, area or region may indicate a second member, area or region without deviating from the spirit of the present invention.

Hereinafter, the exemplary embodiments of the present invention will be described below with reference to drawings which schematically illustrate the exemplary embodiments. In the drawings, illustrated shapes may change according to, for example, manufacturing technology and/or tolerance. Accordingly, the exemplary embodiments of the present invention should not be construed as limited to specific shapes of areas illustrated herein and include changes in shapes that may occur during manufacturing.

FIG. 1 is a block diagram of the blind-spot collision warning system according to a preferred exemplary embodiment of the present invention.

Referring to FIG. 1, the present invention is configured by including a steering angle sensor 20 for detecting a steering angle while driving, a first rear-side radar 30 for detecting a target on the left rear side of the vehicle, a second rear-side radar 40 for detecting a target on the right rear side of the vehicle, a control unit 10 for selectively correcting the position of a target detected by the first rear-side radar 30 or the second rear-side radar 40 according to the steering angle detection result of the steering angle sensor 20, and determining whether a warning is generated in consideration of the correction result, and a warning generation unit 50 for generating a warning when the control unit 10 determines a warning generation situation.

Hereinafter, the configuration and operation of the blind-spot collision warning system according to the present invention which is configured as described above will be described in more detail.

First, the steering angle sensor 20 detects a steering angle of a steering wheel. With the steering wheel aligned state as a reference point of 0 degrees, left steering may be detected as a positive (+) angle, and right steering may be detected as a negative (−) angle. This is an example, and right steering may be detected as a negative (−) angle and left steering may be detected as a positive (+) angle.

The steering angle detected by the steering angle sensor 20 is provided to the control unit 10, and the control unit 10 determines a lane change situation according to the steering angle information. That is, the control unit 10 has information about a positive reference angle value (R+) and a negative reference angle value (R−), and when the steering angle is within the range of a positive reference angle value (R+) and a negative reference angle value (R), it may determine as a lane change, and when it is outside the range, it may determine as a lane change.

That is, when the steering angle is greater than or equal to the positive reference angle value (R+), it may be determined as a lane change to the left lane, and when the steering angle is less than or equal to the negative reference angle value (R−), it may be determined as a lane change to the right lane.

In the above, positive and negative indicate directions, and therefore, if the absolute value of the steering angle is greater than or equal to a reference angle value (R), it may determine that it is a lane change situation.

The first rear-side radar 30 and the second rear-side radar 40 detect targets on the rear left and rear right sides of the vehicle, respectively.

The control unit 10 controls a warning generation unit 50 according to whether a target (other vehicle on the rear side) is detected by the first rear-side radar 30 and the second rear-side radar 40 in a lane change situation. The warning generation unit 50 may generate a warning by using one or both of a visual warning and an aural warning.

The control unit 10 performs a process of correcting the position of the target detected by the first rear-side radar 30 or the second rear-side radar 40 according to the steering direction, and performs a control to stop the execution of the position correction process in a state where the lane change is completed.

This will be explained with more specific examples as follows.

Figure 2:
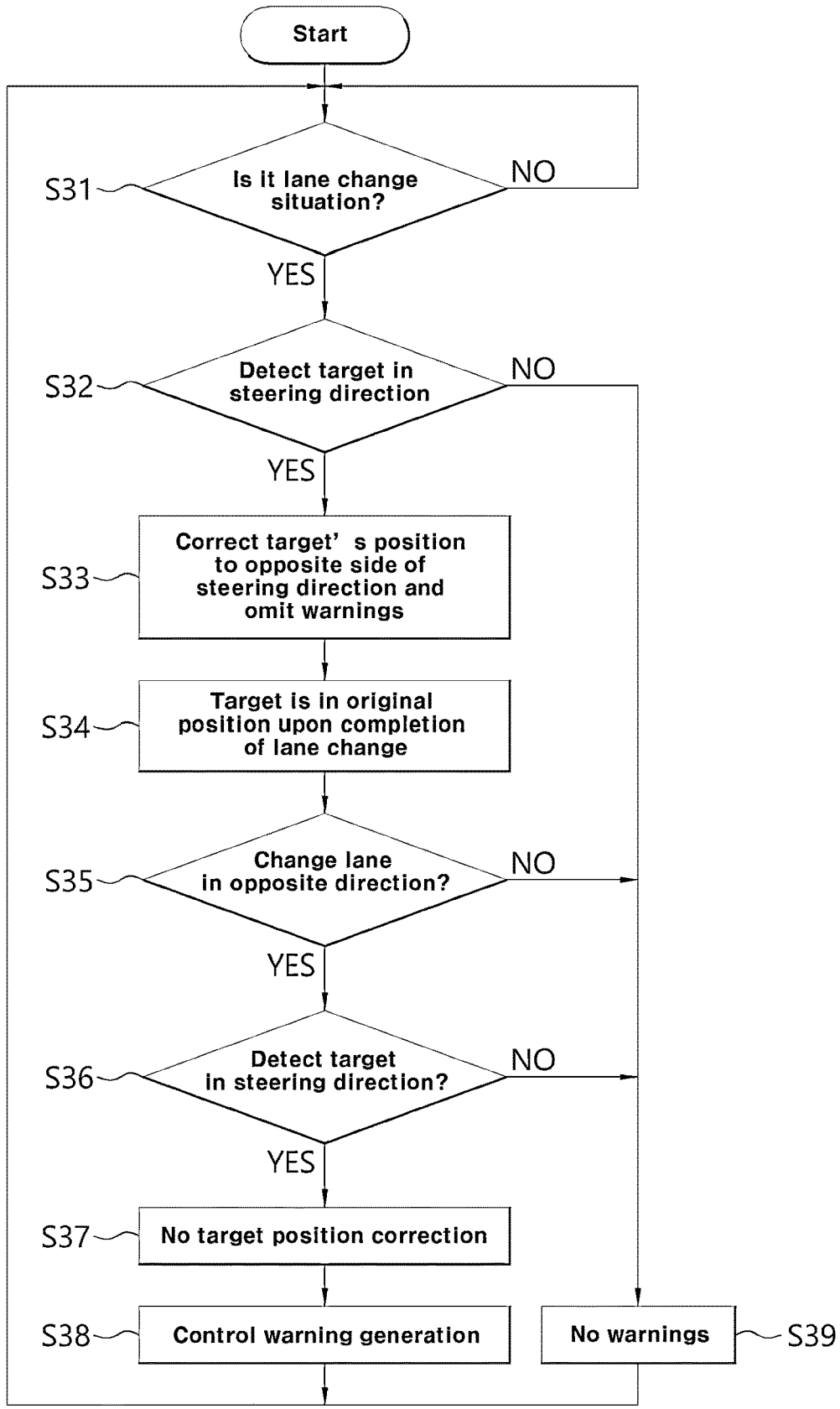
FIG. 2 is a flowchart of the method for generating a blind-spot collision warning according to a preferred exemplary embodiment of the present invention.

FIG. 2 is a flowchart of the method for generating a blind-spot collision warning according to the present invention.

FIG. 2 is a process performed by the control unit 10 described above.

First, as in step S31, the steering angle and direction are determined to determine whether it is a lane change situation and the lane change direction.

As described above, the steering angle detected by the steering angle sensor 20 has a positive angle or a negative angle depending on the direction, and in the present invention, for the convenience of explanation, the left side is described as a positive angle, and the right side is described as a negative angle.

It is assumed that the present invention operates the determination of a lane change situation and the determination of a direction according to the detection of the steering angle only when it is greater than or equal to the positive reference angle (R+) or less than or equal to the negative reference angle (R−).

The reference angle (R) may be 20 to 25 degrees.

For example, if the steering angle becomes 21 degrees due to abrupt manipulation of the steering wheel while driving in a state where the steering angle is 0 degrees, it may be determined that the lane is changed to the left lane.

Conversely, if the steering angle becomes −21 degrees while driving with the steering angle of 0 degrees, it may be determined that the lane is changed to the right lane.

Figure 3:
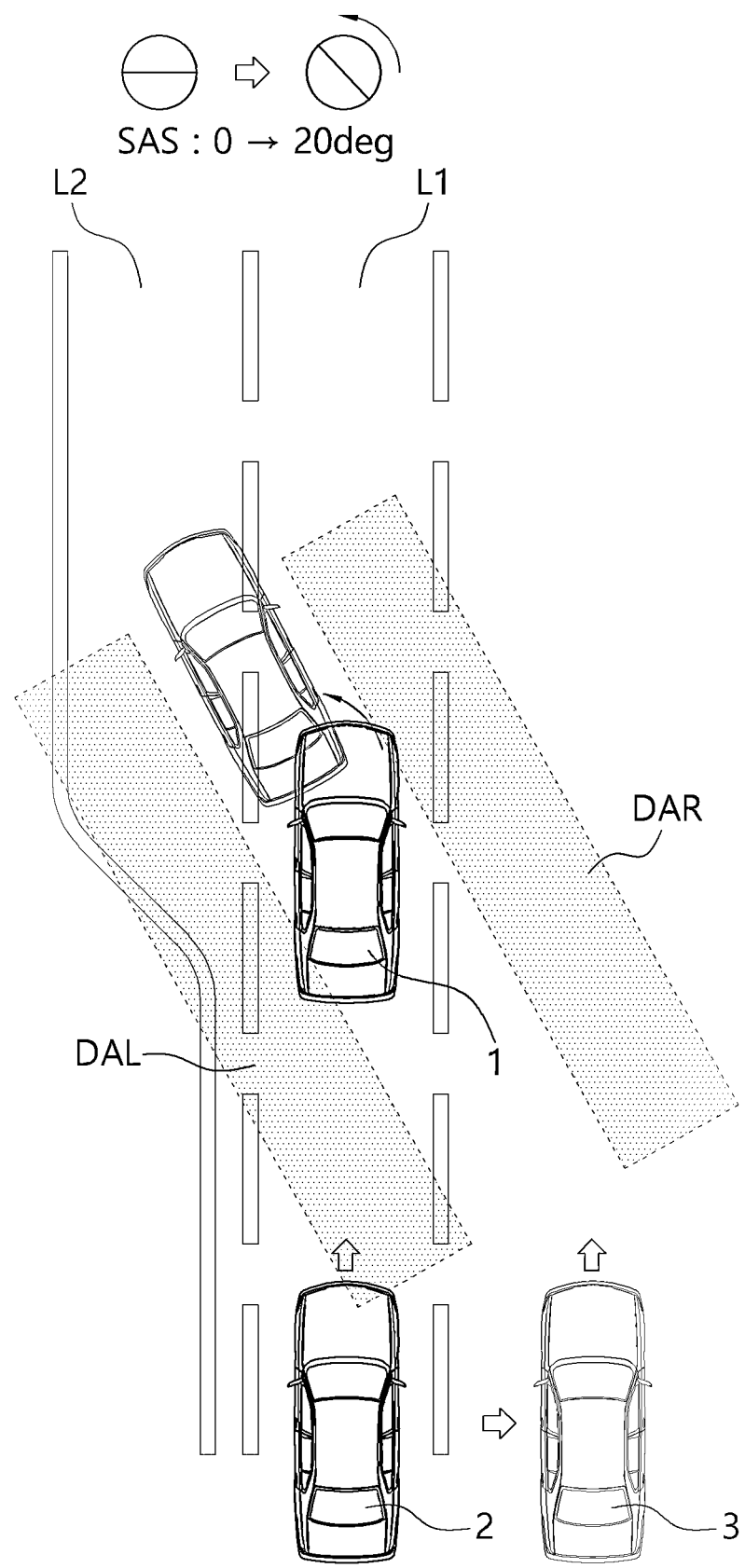
FIGS. 3 to 6 are exemplary diagrams for explaining whether the target vehicle position is corrected and the warning state according to the driving state of a host vehicle, respectively.

FIG. 3 is an exemplary diagram in which the host vehicle 1 changes a lane from the driving lane (L1) to the left lane (L2).

When the steering angle of a host vehicle 1 detected by the steering angle sensor 20 is greater than or equal to the positive reference angle (R+), it is determined as a lane change situation of the host vehicle 1 to the left lane (L2).

When the host vehicle 1 changes lanes at a gentle angle less than the positive reference angle (R+), the present invention does not operate because there is no fear of generating a false warning.

That is, the present invention is applied only to a sudden manipulation of the steering wheel.

Next, as in step S32, the control unit 10 checks whether the target vehicle 2 is detected through the first rear-side radar 30 that detects a target in the left rear direction in the steering direction.

In fact, the target vehicle 2 is a vehicle located at the rear side of the host vehicle 1 in the driving lane (L1), but it may be detected as a vehicle driving from the left rear side of the host vehicle 1 by abrupt steering of the host vehicle 1.

When the target vehicle 2 is not detected in the left detection area (DAL), which is the detection area of the first rear-side radar 30, the collision risk warning is omitted as in step S39.

In addition, when the target vehicle 2 is detected in the left detection area (DAL), the control unit 10 does not perform a control for generating a warning, and performs a process of correcting the position of the target vehicle 2 to the opposite side of the steering direction as in step S33.

As mentioned above, the actual target vehicle 2 is traveling in the lane (L1) rather than the left rear side of the host vehicle 1, and it prevents the generation of a false warning by correcting the detected location of the target vehicle 2 toward the right detection area (DAL) in consideration of this point to arrange the corrected target vehicle 3.

Next, when the lane change is completed as in step S34, the corrected position of the target is corrected to the original position.

Figure 4:
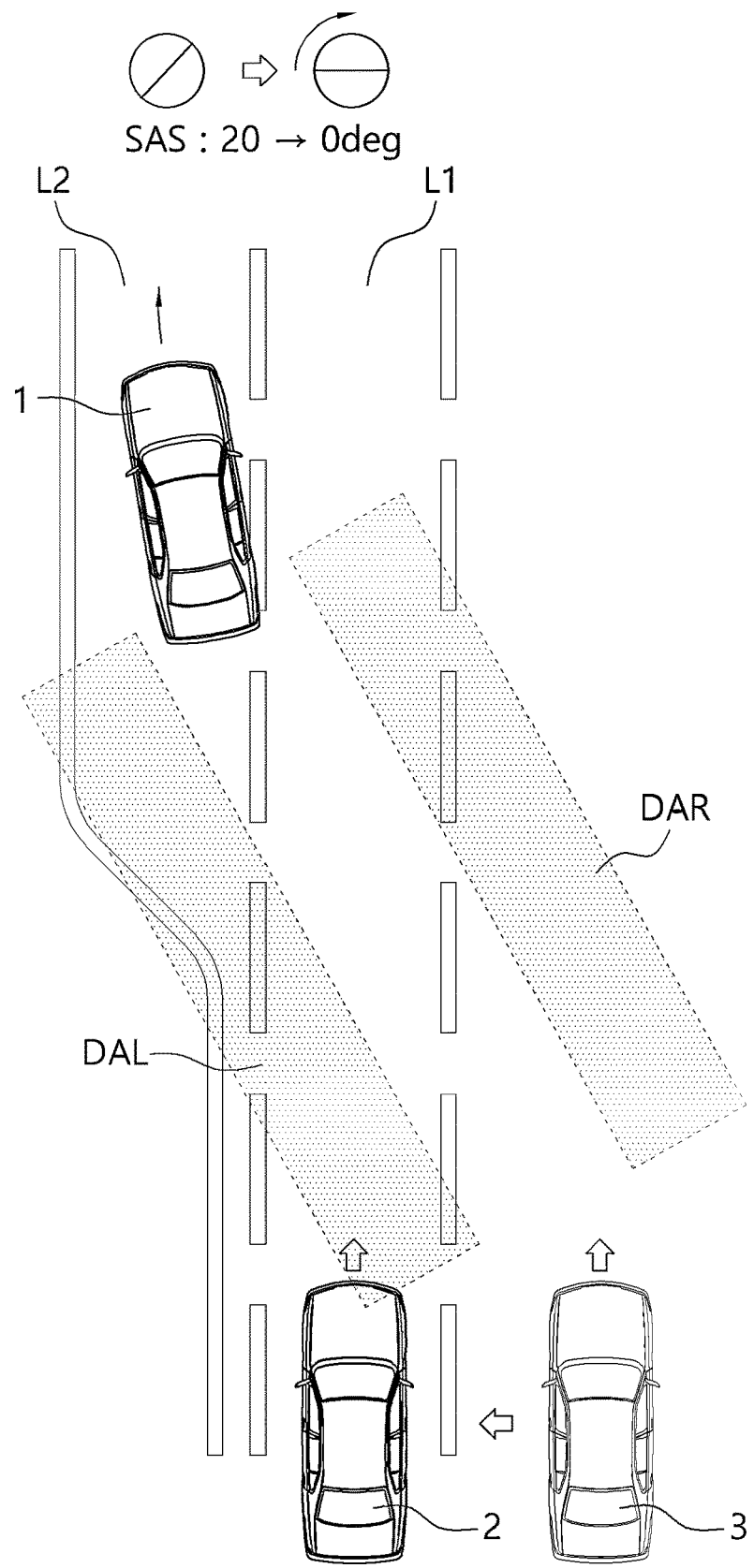

FIG. 4 is an exemplary diagram for explaining step S34.

The completion of the lane change may be specified when the steering angle detected by the steering angle sensor 20 is within a range which is set based on 0 degrees. For example, it may be within ±2 degrees.

In this state where the lane change is completed, the corrected position of the target vehicle 3 is returned to the original position of the target vehicle 2.

Accordingly, the target vehicle 2 may be located in the right lane (L1) of the lane (L2) in which the host vehicle 1 is located.

In this state, the control unit 10 may check whether the host vehicle 1 again attempts to change the lane to the right, which is the opposite direction, as in step S35.

Figure 5:
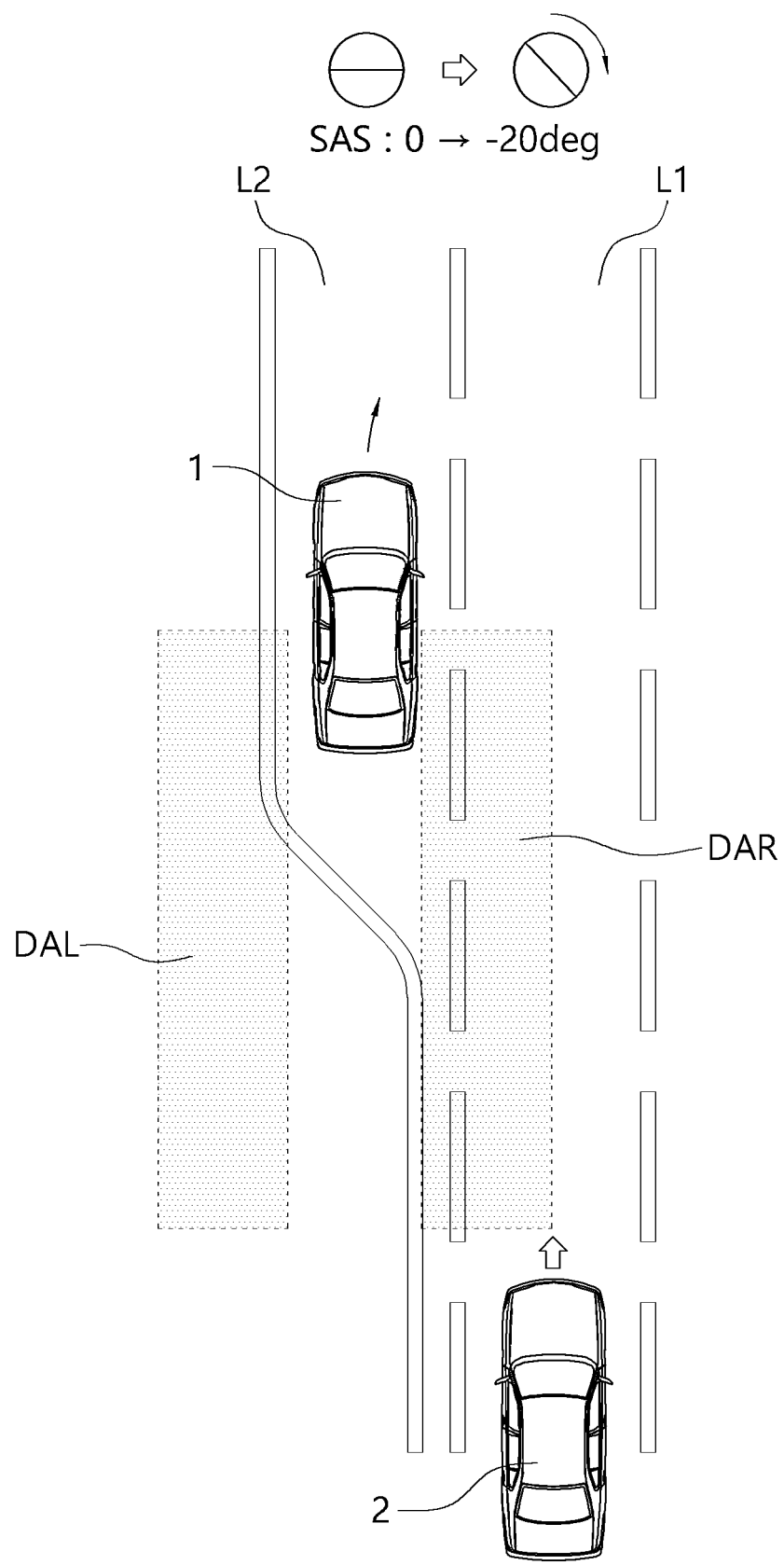

FIG. 5 is an exemplary diagram for explaining a state in which a lane change in the opposite direction is attempted in a lane change state.

Step S35 is applied when changing the lane again to the opposite lane within a set time after changing lanes, and when the steering angle detected by the steering angle sensor 20 is less than or equal to the negative reference angle (R−) (the absolute value is greater than or equal thereto), the control unit 10 determines a lane change to the opposite lane after changing the lane.

In this case, it is also based on a sudden change in the steering angle, and if the steering is steered below the negative reference angle (R−), as in step S33 described above, if the position of the detected target vehicle 2 is corrected in the opposite direction, it is impossible to warn of the risk of collision, and thus, when the target vehicle 2 is detected in the right detection area (DAR) in step S36, the position correction of the target vehicle 2 is omitted as in step S36, and by controlling the warning generation as in step S38, the warning generation unit 50 warns the driver that there is a risk of a collision.

That is, in the present invention, when a target is detected in a detection area in the same direction as the steering direction during abrupt steering beyond the reference angle (R), it performs a control to correct the position of the target to prevent the generation of a false warning.

In addition, when a lane change is attempted by abruptly reverse steering within a set time after changing lanes, it has a feature that the target position correction is omitted to warn of the risk of a collision.

Figure 6:
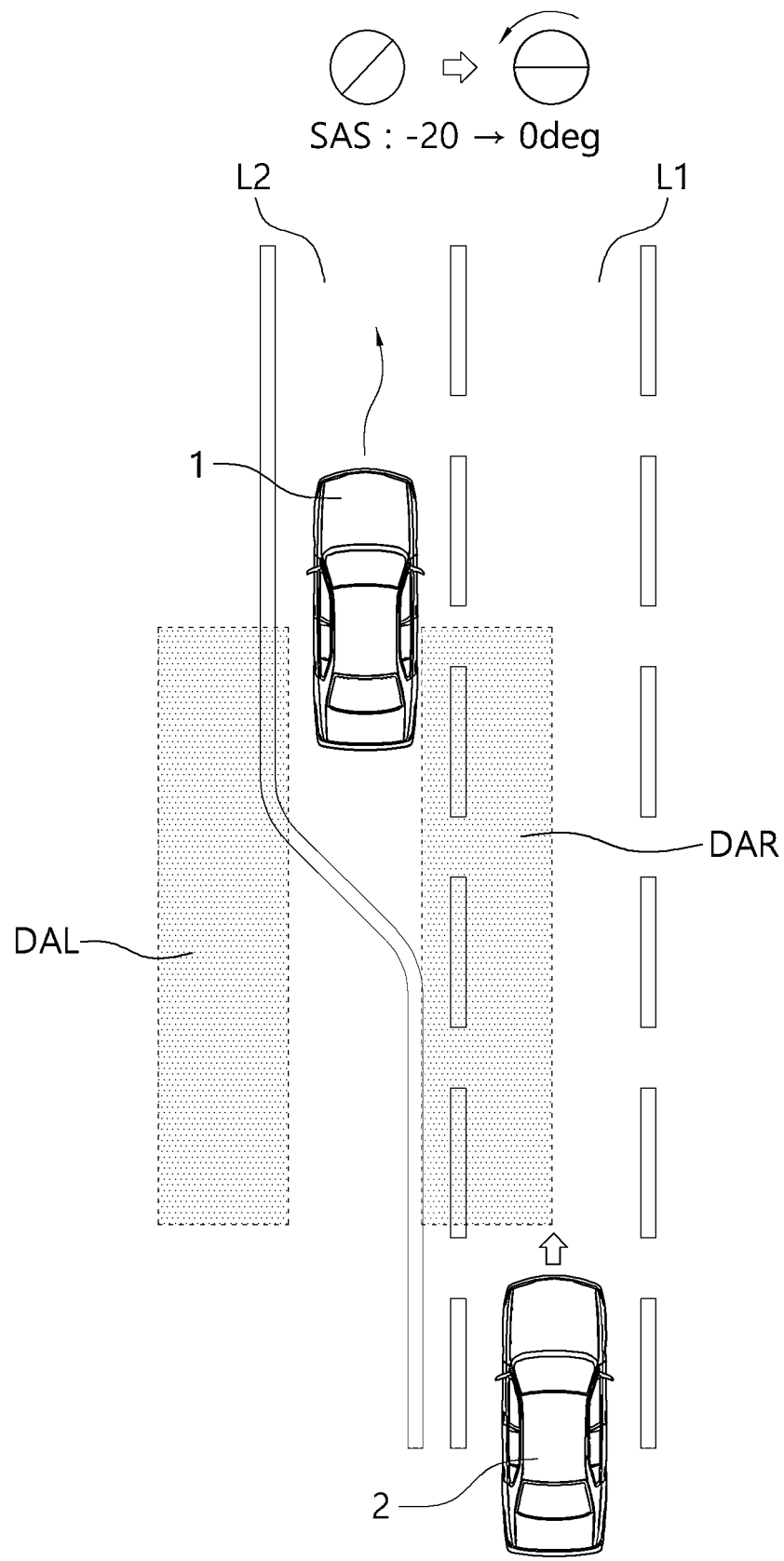
Figure 7:
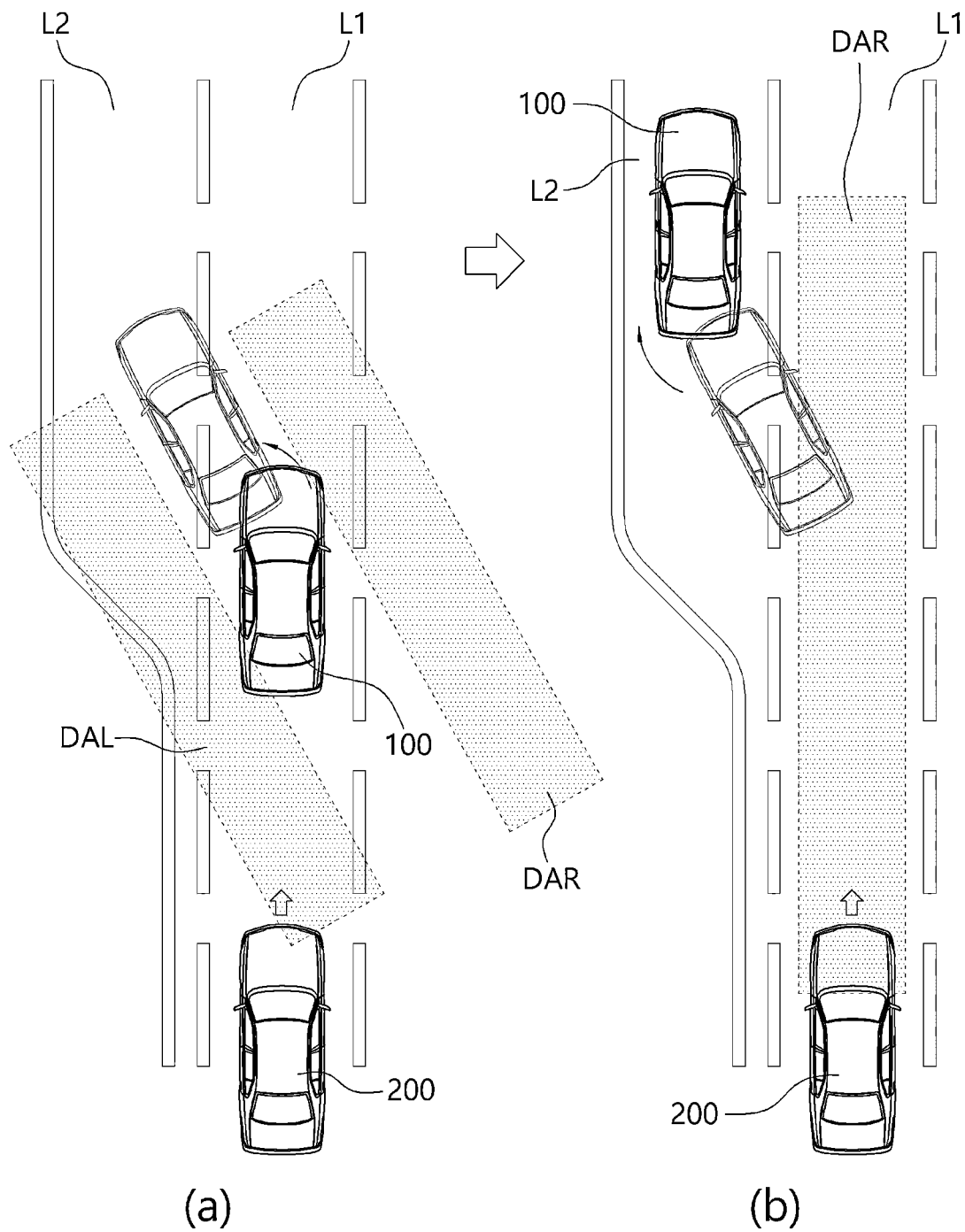
FIG. 7 is an exemplary diagram of a state in which a false warning is generated in the conventional blind-spot collision warning method.

FIG. 6 is an exemplary diagram when the steering angle is again steered within a range set based on 0 degrees, and afterwards, step S31 is performed again.

It will be apparent to those of ordinary skill in the art that the present invention is not limited to the above exemplary embodiments and may be variously modified and changed within the scope without departing from the technical gist of the present invention.

[Explanation of Reference Numerals]

| | |
|---|---|
| 10: Control unit | 20: Steering angle sensor |
| 30: First rear-side radar | 40: Second rear-side radar |
| 50: Warning generation unit | |

The invention claimed is:

1. A blind-spot collision warning system, comprising:
a steering angle sensor for detecting a steering angle of a vehicle;
a first rear-side radar for detecting an object on the left rear side of the vehicle;
a second rear-side radar for detecting an object on the right rear side of the vehicle; and
a control unit for determining a lane change situation at an angle greater than or equal to a set angle according to the steering angle and direction information detected by the steering angle sensor, and correcting the position of the object to the opposite side of the steering direction to prevent the generation of a false warning, when the object is detected by the first rear-side radar or the second rear-side radar in a lane change direction.

2. The blind-spot collision warning system of claim 1, wherein after changing lanes, if an attempt is made to change the lane at an angle greater than or equal to a first set angle in the opposite direction to the previous lane change direction within a set time, when an object is detected by the second rear-side radar or the first rear-side radar in the current lane change direction, the control unit determines not to correct the position of the object.

3. The blind-spot collision warning system of claim 2, wherein the first set angle is 20 degrees to 25 degrees, or −20 degrees to −25 degrees.

4. The blind-spot collision warning system of claim 1, wherein when the steering angle detected by the steering angle sensor is within a second set angle which is set based on 0 degrees, the control unit determines that the lane change is completed, and returns the position of the corrected object to the original position when the lane change is completed.

5. The blind-spot collision warning system of claim 4, wherein the second set angle is −2 degrees to 2 degrees.

6. A device for preventing a false warning, comprising:
a steering angle sensor for detecting a steering angle of a vehicle;
a rear-side radar for distinguishing and detects objects on the left and right rear sides of the vehicle; and
a control unit for determining a lane change direction according to the detection result of the steering angle sensor, and correcting the position of the object detected on the side and rear in a lane change direction in the opposite direction to the steering direction.

7. The device of claim 6, wherein the rear-side radar comprises a first rear-side radar for detecting an object on the left rear side of the vehicle, and a second rear-side radar for detecting an object on the right rear side of the vehicle.

8. The device of claim 7, wherein the control unit determines a lane change situation at an angle greater than or equal to a set angle according to the steering angle and direction information detected by the steering angle sensor, and corrects the position of the object to the opposite side of the steering direction to prevent the generation of a false warning, when an object is detected by the first rear-side radar or the second rear-side radar in a lane change direction.

9. The device of claim 8, wherein after changing lanes, if an attempt is made to change the lane at an angle greater than or equal to a first set angle in the opposite direction to the previous lane change direction within a set time, when an object is detected by the second rear-side radar or the first rear-side radar in the current lane change direction, the control unit determines not to correct the position of the object.

10. The device of claim 9, wherein the first set angle is 20 degrees to 25 degrees, or −20 degrees to −25 degrees.

11. The device of claim 8, wherein when the steering angle detected by the steering angle sensor is within a second set angle which is set based on 0 degrees, the control unit determines that the lane change is completed, and returns the position of the corrected object to the original position when the lane change is completed.

12. The device of claim 11, wherein the second set angle is −2 degrees to 2 degrees.

13. A method for generating a blind-spot collision warning which is performed by a control unit, the method comprising the steps of:
a) determining a lane change situation when the steering angle is greater than or equal to a first set angle; and
b) correcting the position of a detected object to the opposite side of the steering direction, when an object is detected on the side and rear side of a first steering direction in a lane change situation.

14. The method of claim 13, further comprising the step of:
c) determining that the steering is complete when the steering angle is within a second set angle based on 0 degrees, and returning the position of a corrected object to the original position, after step b).

15. The method of claim 14, wherein if it is determined that a lane change situation has occurred in a second steering direction which is the opposite direction of the first steering direction at an angle greater than or equal to the first set angle within a set time after step c), it is determined whether there is an object in the rear side in the second steering direction, and a warning is generated without correcting the position of the object if there is an object.

16. The method of claim 15, wherein the first set angle is −20 degrees to −25 degrees and 20 degrees to 25 degrees.

17. The method of claim 15, wherein the second set angle is −2 degrees to 2 degrees.

18. The method of claim 14, wherein the first set angle is −20 degrees to −25 degrees and 20 degrees to 25 degrees.

19. The method of claim 14, wherein the second set angle is −2 degrees to 2 degrees.

* * * * *